US006363325B1

(12) United States Patent
Bates et al.

(10) Patent No.: US 6,363,325 B1
(45) Date of Patent: Mar. 26, 2002

(54) AUTOMOTIVE EMERGENCY AWARENESS SYSTEM

(75) Inventors: Cary Lee Bates, Rochester; Jeffrey Michael Ryan, Byron; John Matthew Santosuosso, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,594

(22) Filed: Jan. 31, 2000

(51) Int. Cl.[7] ............................ G06F 7/00; G06F 9/00; G06F 12/00; G06F 17/00; G06F 19/00

(52) U.S. Cl. ........................ 701/301; 701/300; 701/14; 701/28; 701/24; 380/30; 380/29; 380/31; 380/28; 702/187; 345/184; 345/156; 345/970; 345/40

(58) Field of Search ................................ 701/301, 300, 701/14, 28, 24; 380/29, 31, 30, 28; 702/187; 345/184, 156, 970, 440

(56) References Cited

U.S. PATENT DOCUMENTS

| | | | | | |
|---|---|---|---|---|---|
| 3,891,046 | A | * | 6/1975 | Oicles | 180/105 E |
| 4,718,025 | A | * | 1/1988 | Minor et al. | 364/550 |
| 5,497,419 | A | * | 3/1996 | Hill | 380/9 |
| 5,646,994 | A | * | 7/1997 | Hill | 380/9 |
| 5,890,079 | A | * | 3/1999 | Levine | 701/14 |
| 6,154,201 | A | * | 11/2000 | Levin et al. | 345/184 |
| 6,188,340 | B1 | * | 2/2001 | Matsumoto et al. | 341/110 |

* cited by examiner

*Primary Examiner*—William A. Cuchlinski, Jr.
*Assistant Examiner*—Ronnie Mancho
(74) *Attorney, Agent, or Firm*—Gero G. McClellan; Moser, Patterson & Sheridan, LLP

(57) ABSTRACT

A vehicular emergency awareness system and method is provided. A vehicle is provided with an onboard computer system adapted to receive and process signals generated at an external source. Under predetermined conditions, the emergency awareness system alerts the driver of the vehicle of a proximal hazard or emergency, such as hazardous road conditions, nearby emergency vehicles and the like. In one embodiment, a program product is provided which, when executed by the computer, causes the computer or other devices to process the received signal, determine whether a warning should be provided to the driver and, if so, provide a signal to one or more output devices disposed on the vehicle.

32 Claims, 7 Drawing Sheets

AUTOMOTIVE EMERGENCY AWARENESS SYSTEM

BACKGROUND OF THE INVENTION

1. Field of the Invention

The present invention relates to a computer system and more particularly to a computer system adapted for use with a vehicle to alert a driver to certain conditions present in the environment of the vehicle.

2. Background of the Related Art

The failure of drivers to pay close attention to their surrounding environment while driving is a hazard which can result in serious consequences including property damage, personal injury or even death of pedestrians and/or other drivers. Drivers are frequently distracted by events both external and internal to the vehicle, such as loud radios, cell phone conversations, other passengers, billboards, etc. and are not cognizant of road conditions or other impending dangers. Thus, drivers may be oblivious to approaching emergency vehicles, road construction workers, or children in the vicinity of the driver's vehicle. This poses a safety concern for the driver and passenger of the vehicle as well as the people around the vehicle.

A number of devices are currently used to alert the driver of certain conditions external to the vehicle and which may require the driver to adjust his or her driving pattern. For example, most emergency vehicles send out warning signals in the form of sirens, horns, lights, etc. Such devices are intended to attract the attention of drivers who will then respond appropriately, such as by slowing their speed or making way for oncoming emergency vehicles. However, such devices which produce warning signals external to the immediate environment of the driver are not always detected by the intended drivers for reasons noted above such as radios, cell phones, and other items which may get the attention of the drivers.

Therefore, there is a need for an emergency awareness system which can alert drivers to certain conditions.

SUMMARY OF THE INVENTION

The invention generally provides an apparatus, article of manufacture and method for signal processing. In one aspect of the invention, a computer system includes a signal processing unit having one or more signal sensors and one or more output devices coupled thereto. In one embodiment, the sensors are adapted to receive signals from an external source and then transmit a corresponding input signal to the signal processing unit. The signal processing unit includes a memory containing signal data which is compared to the input signal. The signal processing unit then selectively produces an output signal to the one or more output devices which, in turn, are configured to provide a warning output.

In another aspect of the invention, a vehicle includes a computer system comprising one or more sensors, a signal processing unit and one or more output devices. The one or more sensors are adapted to receive a source signal from a source and transmit an input signal to the signal processing unit. The signal processing unit is configured to generate an output signal in the event the input signal is recognizable. The one or more output devices are configured to receive the output signal and then provide a warning output indicating a condition external to the vehicle. In one embodiment, the signal processing unit includes a memory containing trigger condition data which, when read and executed by the computer system, determines whether the output signal is generated.

In yet another aspect of the invention, a signal-bearing medium containing a program is provided. When executed by one or more processors, the program performs the steps of: processing a signal to provide signal information therefrom; determining a relationship between the signal information and stored information contained in a data structure; and outputting a warning signal to one or more output devices to alert a person of a condition in an external environment of the person. In one embodiment, the data structure is contained on the signal-bearing medium. In another embodiment, the stored information identifies a signal source selected from the group comprising vehicles, road hazard sites, school zones and combinations thereof.

In yet another aspect of the invention, a method of alerting a driver in a vehicle to a condition external to the vehicle is provided. The method comprises providing a computer system containing a data structure having information, receiving a signal from a source external to the vehicle, processing the signal to obtain signal information and determining whether a relation between the signal information and the information contained in the data structure exists. In one embodiment, a determination is made whether trigger condition information stored in the data structure is satisfied by the signal information. If the trigger condition information is satisfied, then a signal is output to one or more output devices disposed on the vehicle.

In still another aspect of the invention, a method of detecting a condition in an environment of a vehicle is provided. The method comprises: training a computer system to recognize one or more signal types identifying conditions selected from the group of emergency vehicles, road hazard area, school zones and combinations thereof; receiving a signal from a source; determining whether the signal is sufficiently similar to one or more of the signal types; and if the signal is sufficiently similar in (c), outputting a warning signal to one or more output devices.

In still another aspect of the invention, a data structure is provided which is adapted to be accessed by a computer disposed in a vehicle. In one embodiment, the data structure includes signal information, trigger condition information, triggered actions information and any combination thereof. In one embodiment, the signal information is adapted to identify signals originating at external sources and received by a computer. The signal type information may identify emergency medical vehicles such as ambulances, police vehicles, road construction vehicles and the like. The signal type information may further identify school zones, road hazard sites and the like.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides an automotive emergency awareness system and method of alerting drivers to important conditions or situations in the environment of the driver's vehicle. A computer processing system receives signals from the vehicle's environment, processes the received signals and outputs a signal to one or more warning devices. In general, warning signals originating at external sources are received by the computer processing system and are output in a manner to alert the driver of a situation in the vicinity of the driver. Outputting the received signal includes signaling an emergency warning light on the vehical dashboard, modulating (i.e., reducing) the volume of audio devices in the vehicle (e.g., a radio, a cell phone, a TV, a CD player, etc. announcing a message over the audio devices about the nature of the situation, or otherwise enhancing or simulating the signals output to the devices in the vehicle.

Preferably, the computer processing system is adapted to discriminate between signals. In one embodiment, the computer system is "trained" to recognize select signal patterns by storing signal samples on the computer system and utilizing known or unknown signal processing algorithms to compare, correlate or otherwise process the stored signal samples and received signals to one another.

Figure 1:
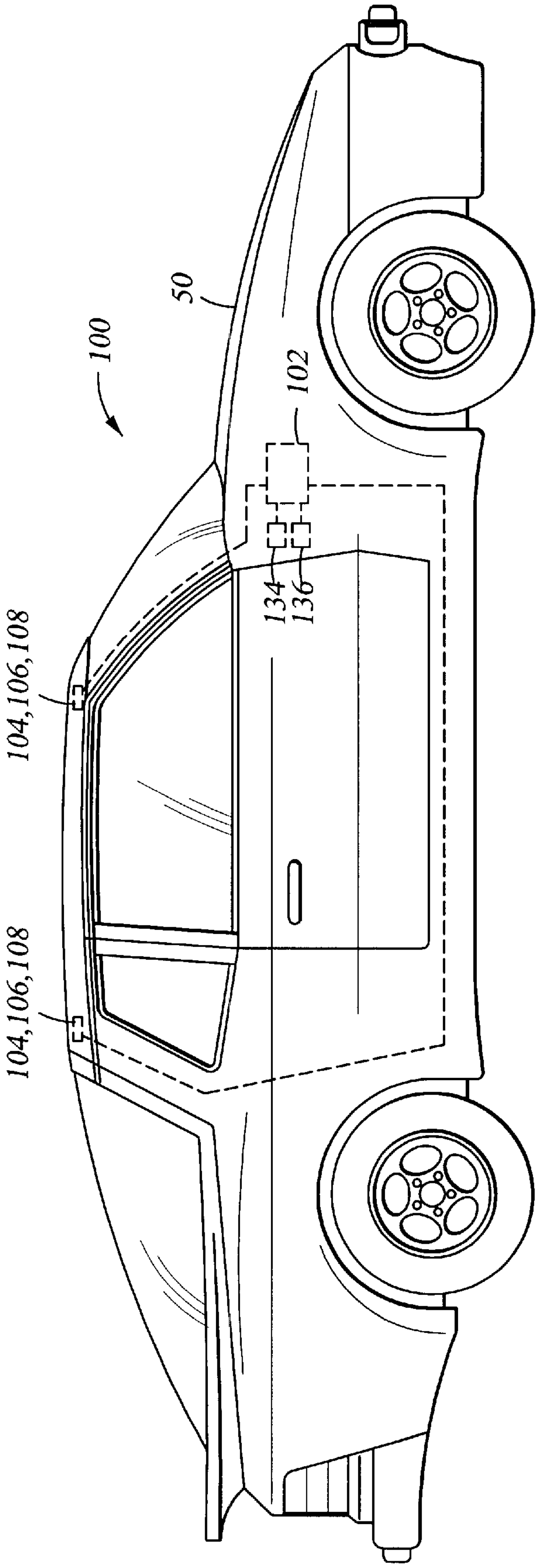
FIG. 1 is a schematic representation of a vehicle having an emergency awareness system.

FIG. 1 is a schematic representation of a vehicle 50 having an emergency awareness system 100. The emergency awareness system 100 includes one or more sensors 104, 106, 108 coupled to an onboard computer processing system 102. Illustratively, the sensors include digital sensors 104, audio sensors 106 and video sensors. The provision of sensors adapted to receive both digital and analog signals enables the emergency awareness system 100 to receive and process more than one signal-type at a time. The onboard computer processing system 102 generally comprises various processing hardware and software products as well as input devices 134 and output devices 136.

As will be described in detail below, one embodiment of the invention is implemented as a program product for use with a computer system such as, for example, the onboard computer processing system 102 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 2:
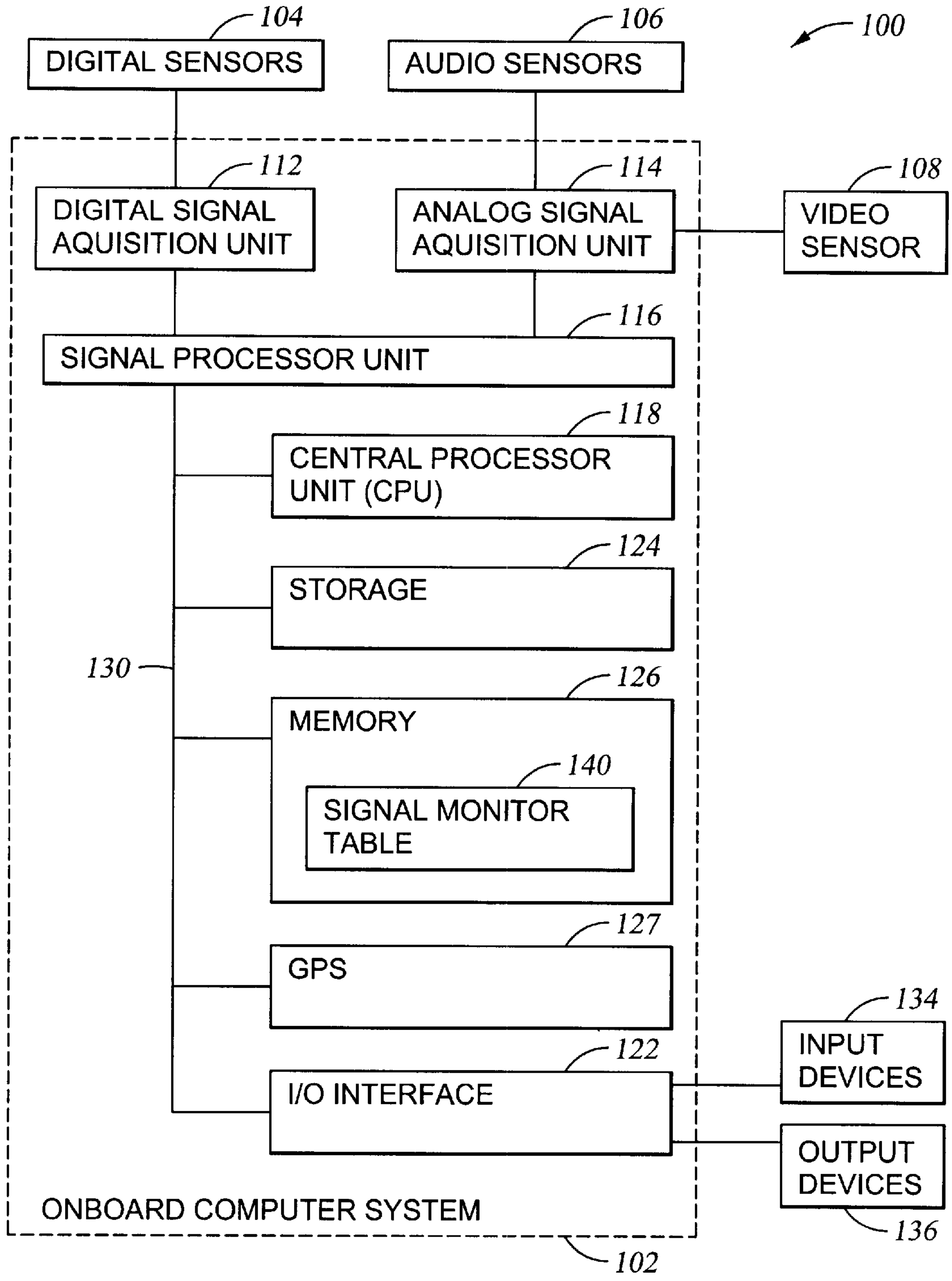
FIG. 2 is a schematic representation of an emergency awareness system.

FIG. 2 is a schematic representation of the emergency awareness system 100. The onboard computer processing system 102 includes signal acquisition units 112, 114, a signal processing unit 116, a central processing unit (CPU) 118, an I/O interface 122, storage 124, memory 126 and a Global Positioning System (GPS) unit 127. The components of the onboard computer processing system 102 are connected by a bus line 130. The sensors 104, 106, 108 are connected to an appropriate acquisition unit 112, 114 according to the type of signal received by the sensors 104, 106, 108. Accordingly, the digital sensors 104 are coupled to a digital signal acquisition unit 112 and the audio sensors 106 and video sensors 108 are coupled to an analog signal acquisition unit 114. The signal acquisition units 112, 114 may be any of a variety of interface units and/or signal converters. The signal acquisition units 112, 114 are each connected to the signal processor unit 116 which includes circuitry adapted to process the signals received from the acquisition units 112, 114. The I/O interface 122 may be any entry/exit device adapted to control and synchronize the flow of data into and out of the CPU 118 from and to peripheral devices such as input devices 134 and output devices 136. The input devices 134 can be any device adapted to provide input, such as configuration parameters, to the onboard computer processing system 102. For example, a keyboard, keypad, light pen, touch screen, button, mouse, trackball or speech recognition unit could be used. The output devices 136 can include warning lights, a radio volume control, cell phone control, radio signal mixer, a graphics/text display, etc. Although shown separately from the input devices 134, the output devices 136 and the input devices 134 could be combined. For example, a display screen with an integrated touch screen and a display with an integrated key word, or a speech recognition unit combined with a text speech converter could be used.

Memory 126 is preferably a random access memory (RAM) sufficiently large to hold the necessary programming and data structures of the invention. While memory 126 is shown as a single entity, it should be understood that memory 126 may comprise a plurality of modules, and that the memory 126 may exist at multiple levels, from high speed registers and caches to lower speed but larger DRAM chips. When executed on the CPU 118 and/or the signal processor unit 116, the data contained in memory 126 is adapted to control the output devices 136 according to input from the input devices 134 and from the sensors 104, 108. The contents of memory 126 can be loaded from and stored to the storage 124 as needed by the CPU 118.

As shown in FIG. 2, memory 126 contains a signal monitor table 140. The signal monitor table 140 includes signal information for various signal types, e.g., ambulance signals, police signals, road hazard signals, etc. The signal monitor table 140 also includes parameters for the operation of the emergency awareness system 100. For example, the signal monitor table 140 contains trigger conditions which, when met, cause the onboard computer system 102 to provide signals to the output devices 136. Additionally, information pertaining to signals detected during the operation of the emergency awareness system 100 is stored to the signal monitor table 140. During operation, the information contained in the signal monitor table 140 may be used to monitor detected signals and cause the output devices 136 to provide warning signals to a driver of a vehicle in a manner described below.

Storage 124 can be any known or unknown storage medium including a Direct Access Storage Device (DASD), a floppy disk drive, an optical storage device and the like.

Although storage 124 is shown as a single unit, it could be any combination of fixed and/or removable storage devices, such as fixed disk drivers, floppy disk drivers, tape drives, removable memory cards, or optical storage. Memory 126 and storage 124 could be part of one virtual address space spanning multiple primary and secondary storage devices. Although not shown, the storage 124 preferably also includes the configuration settings for the onboard computer processing system 102.

The foregoing embodiments are merely illustrative. It is understood that the one or more of the components of the emergency awareness system 100 shown in FIGS. 1 and 2 may be combined. For example, in one embodiment, the memory 126 can contain signal processing programming, which, when executed by the CPU 118, performs the functions of the signal processor unit 116, thereby eliminating the need for a separate signal processor unit 116. Further, the emergency awareness system 100 can include additional or alternative components according to a particular implementation.

In operation, external signals such as sirens, flashing emergency lights and other analog and/or digital signals are received by the emergency awareness system 100 and processed to determine the source type of the signal. If the emergency awareness system 100 can resolve the received signal to a particular source type, a warning signal may be provided to the output device 136.

Figure 3:
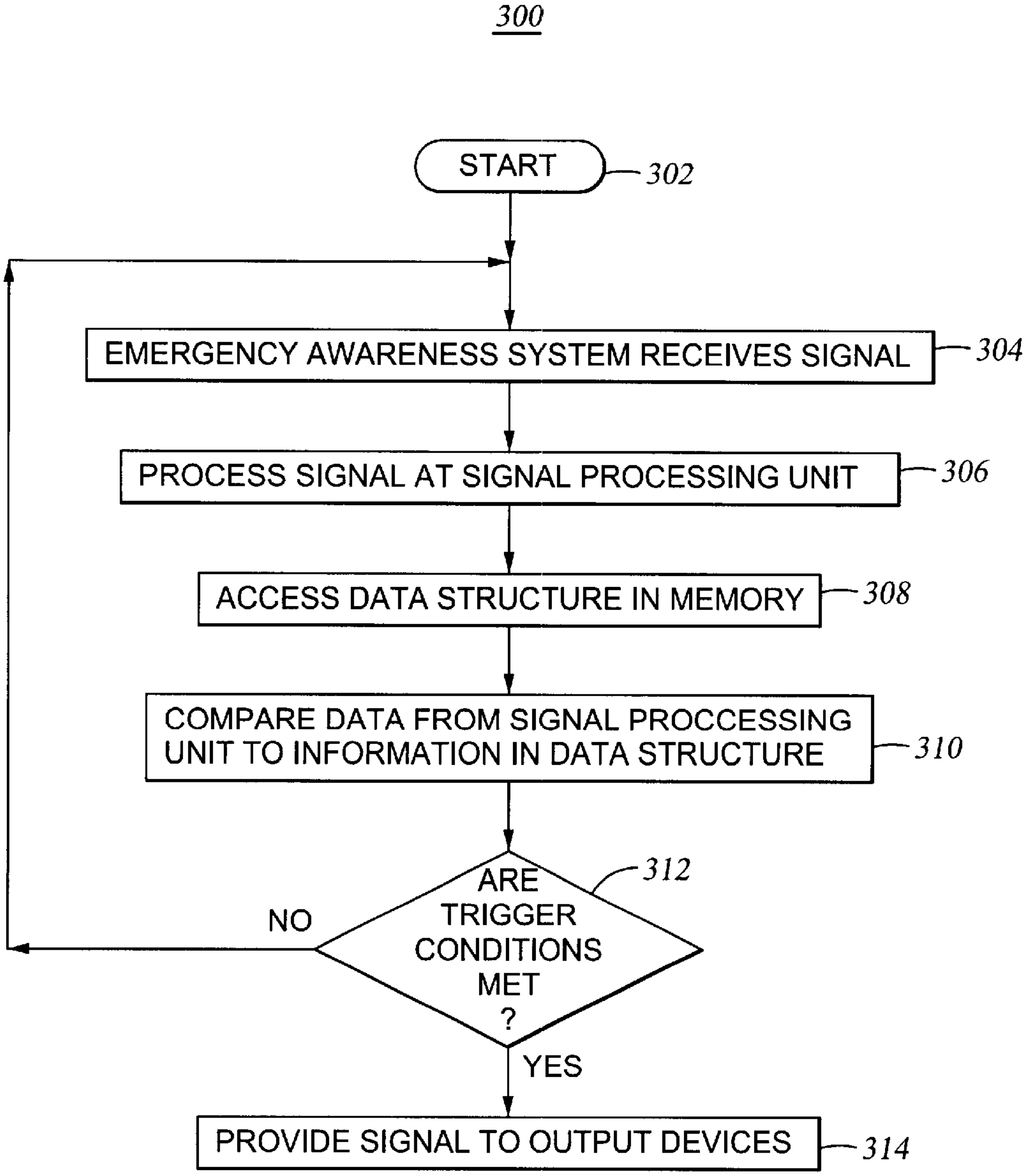
FIG. 3 is a flow diagram of a method employing an emergency awareness system.

FIG. 3 illustrates one embodiment of a process 300 for receiving and processing signals. The process 300 is entered at step 302 typically by activating the emergency awareness system 100. At step 304 emergency awareness system 100 acquires a signal produced by an external source. Signal acquisition is performed initially by the sensors 104, 106, 108 according to the signal type, i.e., digital, audio or video. Subsequently, the received signals are sent to their respective signal acquisition units 112, 114. Thus, digital signals receive by the digital sensors 104 are transmitted to the digital signal acquisition unit 112, while audio and video signals received by the sensors 106 and 108, respectively, are sent to the analog signal acquisition unit 114.

The signal processing is performed at the signal processor unit 116, as shown at step 306. The signal processor unit 116 may include both known and unknown signal processing technologies and algorithms such as Digital Signal Processing (DSP). At step 308, the central processor unit 118 accesses data structures contained in the memory 126, e.g., the signal monitor table 140. At step 310, the information contained in the data structures is compared to the data provided by the signal processor unit 116. When the first signal is received and detected, the comparison at step 310 uses information contained in the signal monitor table 140 to determine the type of signal received by the sensors 104, 106, 108. If a signal type is detected and characterized, an initial entry is made to the signal monitor table 140 and one more fields of the signal monitor table 140 are populated or changed. In the event of subsequently received and detected signals, i.e.,after one or more entries exist in the signal monitor table 140, step 310 involves determining that an entry already exists for the particular signal being processed, in which case the signal monitor table 140 may be updated. In any case, the method 300 then proceeds to step 312 at which point the emergency awareness system 100 determines whether the trigger conditions for a particular signal monitor table entry have been satisfied. If the trigger conditions are met, at step 314 an action is triggered resulting in a state modification to one or more of the output devices 136.

Figure 4:
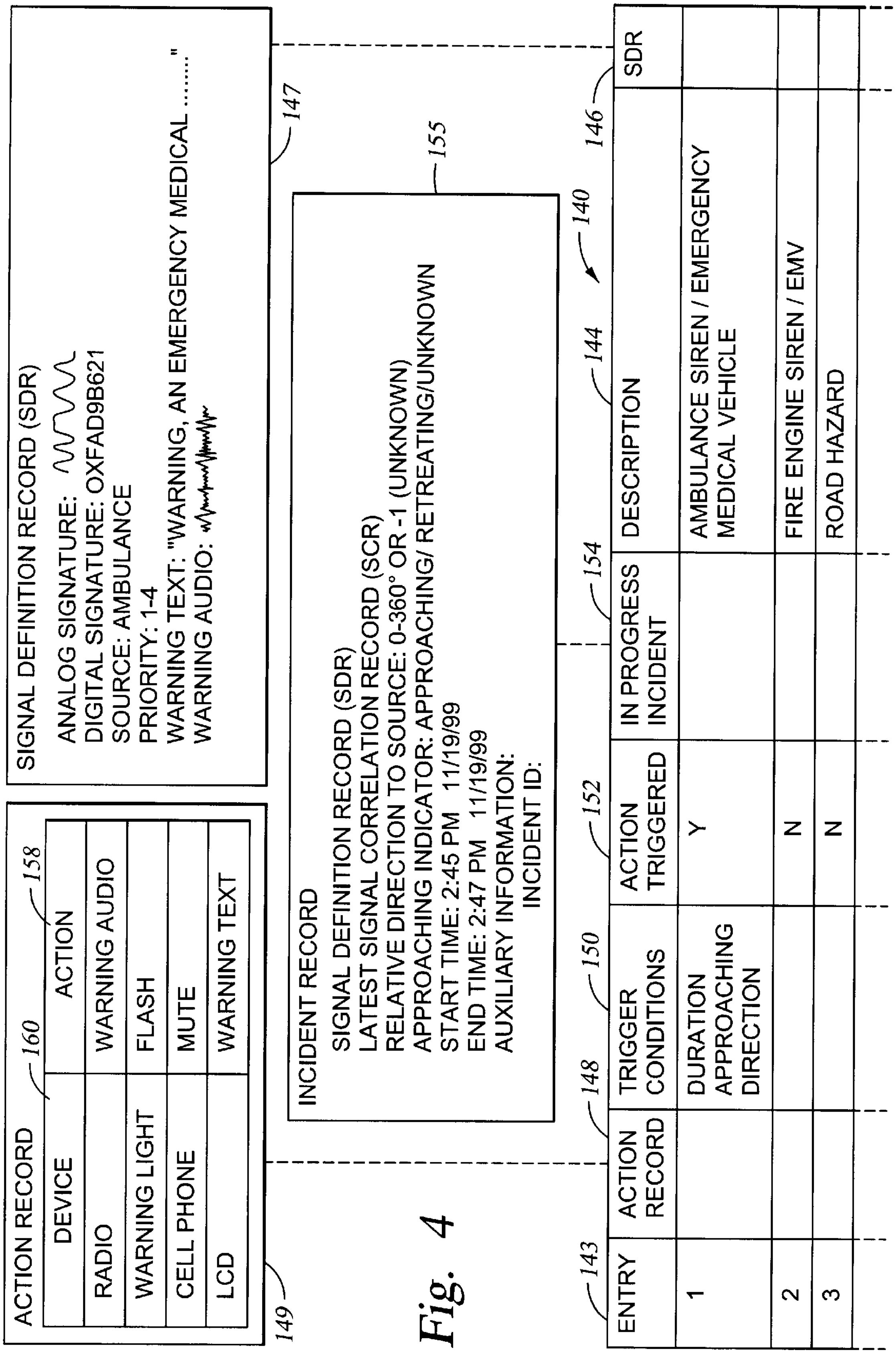
FIG. 4 is a data structure illustrating a monitor table adapted to be contained in and accessed by an emergency awareness system.

In one embodiment, the operation of the onboard computer processing system 102 is determined largely by the monitor table 140 which provides data to and receives data from other components and/or data structures of the onboard computer processing system 102 as necessary. An illustration of the monitor table 140 is shown in FIG. 4. Table 140 includes a number of data fields including an entry number field 143, an action record field 148, a trigger condition field 150, an action triggered field 152, an in-progress incident field 154, a description field 144 and a signal definition record field 146. The entry number field 143 merely provides a numerical categorization of each consecutive row in the monitor table 140. The text of the description field 144 corresponds to data regarding the particular source type of a detected signal. Illustrative entries provided in the description field 144 are ambulance sirens, re engine sirens and road hazards. The description field 144 may contain any number of entries and may be particular or general. For example, rather than providing discrete entries for ambulance sirens and fire engine sirens, a single entry entitled "emergency medical vehicles" may be provided. However, to the extent that the received signals can be discriminated between to determine a particular source type, separate entries in the description field 144 for each source type is preferred.

The signal definition record field 146 contains data in the form of a signal definition record (SDR) 147 identifying various characteristics and parameters associated with a detected signal. Further, the signal characteristics contained signal definition record field 146 relate to the source type identified in the description field 144. Illustratively, the signal definition record (SDR) 147 shown in FIG. 4 includes data regarding an analog signature, a digital signature and a source of the signal. The analog signature and the digital signature are data corresponding to the source (shown here as an ambulance). The SDR 147 also includes the priority of a given source type (as compared to other sources) and the actions which may be taken by the emergency awareness system 100 upon detection of a signal, such as providing warning text and/or warning audio to the output devices 136.

While the SDR 147 contains all available actions which may be taken for a given signal type, any combination of one or more of the available actions may be executed by the emergency awareness system 100. Which of the actions are actually taken is determined by an action record 149 located in the action record field 148. More specifically, the actions actually taken are contained in an action field 158 of the action record 149. In addition to the action field 158, the action record 149 also includes a device field 160 which delineates the output devices designated to perform the desired action. Preferably, the active devices and related actions are selected by a user and input via the input devices 134 (shown in FIG. 2). Illustratively, FIG. 4 indicates that the selected devices include a radio, a dash light, a cell phone and a display. The actions associated with each device include providing a warning audio, a flash, a mute action and a warning text for each of the devices, respectively. The particular action may be any event sufficient to alert a driver of a condition in the driver's environment such as an approaching emergency vehicle.

Whether the device performs its associated action is dependent on whether predetermined trigger conditions are met. The trigger conditions are contained in the trigger condition field 150. The trigger conditions may vary according to the type of signal detected. In one embodiment, trigger conditions may include the duration of the signal, the change in position (both radial and angular) of the signal source relative to the emergency awareness system 100 and/or the direction from which the signal source is approaching. The use of some trigger conditions may depend on the particular construction of the emergency awareness system 100. Thus, for example, where only a single omni-directional audio sensor 106 is provided, resolution of direction is not possible. In general, the trigger conditions are selected to prevent unnecessarily alerting the driver of external events. By providing certain threshold conditions, the number of "false alarms" can be reduced. In the event that each of the trigger conditions are met, the designated actions contained in the action field 158 are performed and the execution of the actions is recorded in the action trigger field 152.

The in-progress incident record field 154, initially empty, is written to upon detection of a signal to create an incident record 155. The incident record 155 contained in the in-progress incident record field 154 may include a pointer to the related SDR 147, a signal correlation record (described below with reference to FIG. 7), the relative direction to source indicator, an approach indicator, the start time at which the signal was detected, and the end time indicating the termination of a particular event. In addition, the incident record 155 contains auxiliary information including an incident ID. The incident ID provides a unique identifier for a particular digital signal source and may be represented by an alphanumeric code. The incident ID facilitates distinguishing between digital signals from different sources even in the event of multiple signal sources of the same type, e.g., two or more ambulances. Other auxiliary information may include the specific source-type, the distance to the source, the closure speed of the source and the like. In practice, some of the auxiliary information, such as the incident ID, is provided only in the event a digital signal is detected because analog signals may not facilitate the provision of such information.

Figure 5:
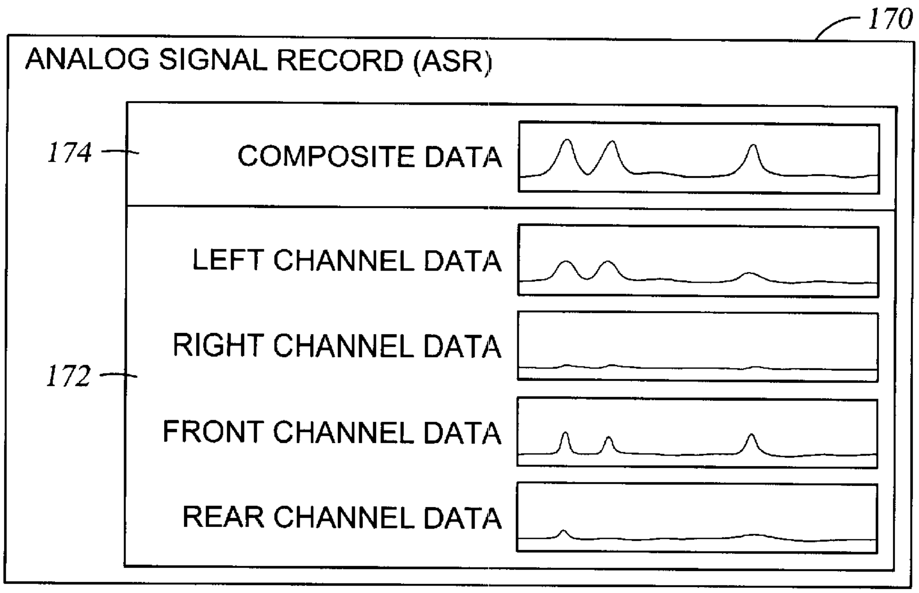
FIG. 5 is a data structure illustrating an analog signal record.
Figure 6:
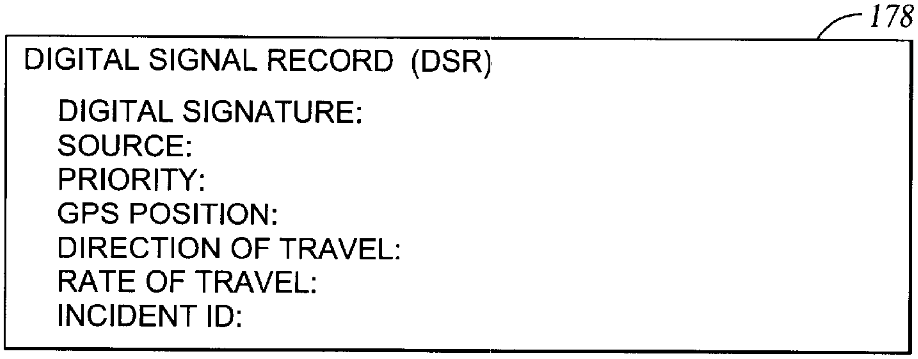
FIG. 6 is a data structure illustrating a digital signal record.
Figure 7:
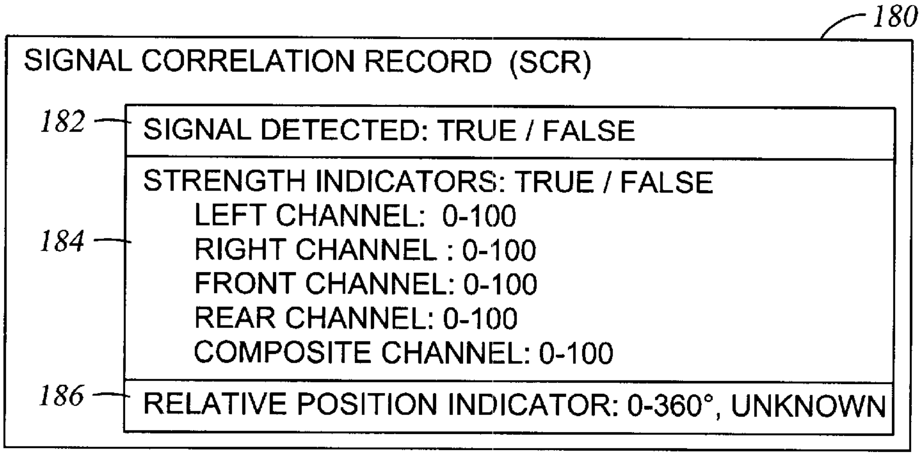
FIG. 7 is a data structure illustrating a signal correlation record.

Additional data structures of the invention are shown in FIGS. 5–7. All or part of the information contained in the data structures of FIGS. 5–7 may be used to populate the fields of the signal monitoring table 140.

Referring first to FIG. 5, an analog signal record (ASR) 170 is shown. The ASR 170 is illustrative of a data structure created after an analog signal has been received by the emergency awareness system 100. The data contained in the ASR 170 is used to detect an analog signal by correlation to data contained in the SDR 147. The ASR 170 includes channel data fields 172 containing the information provided by each of the sensors 106, 108. In the embodiment of FIG. 5, four separate channels representing left, right, front and rear sensors are shown indicating that four separate analog sensors are connected to the onboard computer processing system 102. In practice, one or more sensors 106, 108 and hence, channel data fields, may be used. The information contained in each of the channel data fields 172 is combined and the resulting signal information is contained in the composite data field 174. In one embodiment, filtering mechanisms may be used to discriminate between unique signals where multiple sources exist. Illustrative filtering mechanisms are described below.

A digital signal record (DSR) 178 is shown in FIG. 6 and illustrates the data structure created upon detection of a digital signal. The data contained in the DSR 178 is used to detect a digital signal by comparison to data contained in the SDR 147. The digital signal record 178 contains information extracted from the received digital signal including a digital signal signature, the signal source, the signal priority, a GPS position, a direction of travel, a rate of travel and an incident ID. The digital signature is typically recorded in the form of a string of alphanumeric characters and provides generic information about the source-type, e.g., ambulances, police cars, road construction sites, school crossings, etc. The incident ID uniquely identifies a particular signal source.

An illustrative signature correlation record (SCR) 180 is shown in FIG. 7. The SCR 180 includes a signal detection field 182 indicating whether a received analog signal was matched to a signal stored in the SDR 146 of the signal monitor table 140. Strength indicator fields 184 preferably contain the strength of the analog signals represented by the channel data fields 172 and the composite data field 174 in the analog signal record 170. The strength of the signals provided by each channel may then be analyzed to compute the position of the signal source relative to the emergency awareness system 100. If the relative position of the signal source can be determined, an appropriate value may be stored in a relative position indicator field 186. For example, in one embodiment, the relative position indicator field 186 contains information pertaining to the angular relation between the signal source and the emergency awareness system 100.

The foregoing data structures are merely illustrative and the invention contemplates any additional and/or alternative embodiments. Further, although shown a, separately, one or more of the data structures may be combined.

Figure 8A:
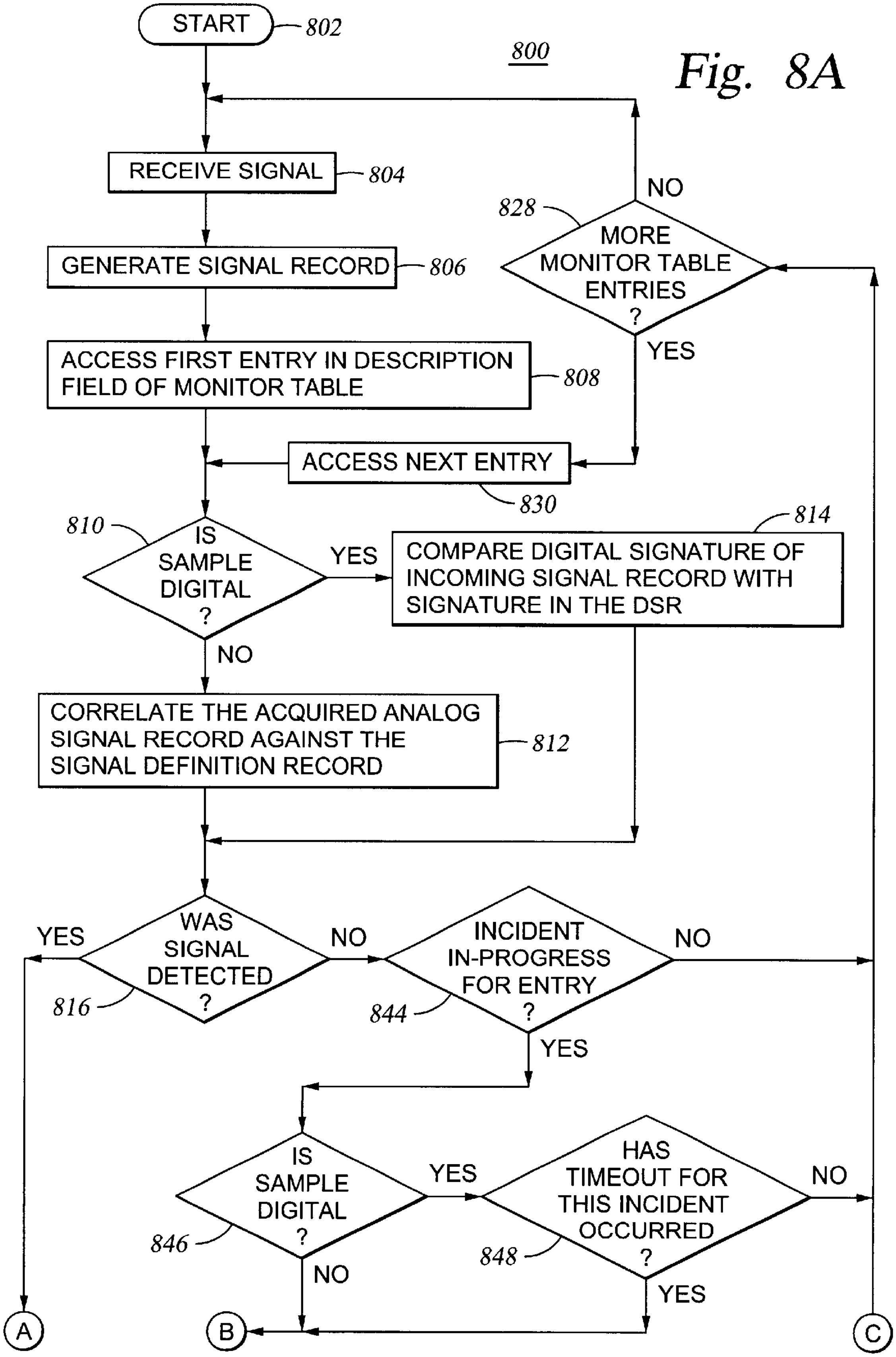
FIG. 8 is a flow diagram of method employing an emergency awareness system.
Figure 8B:
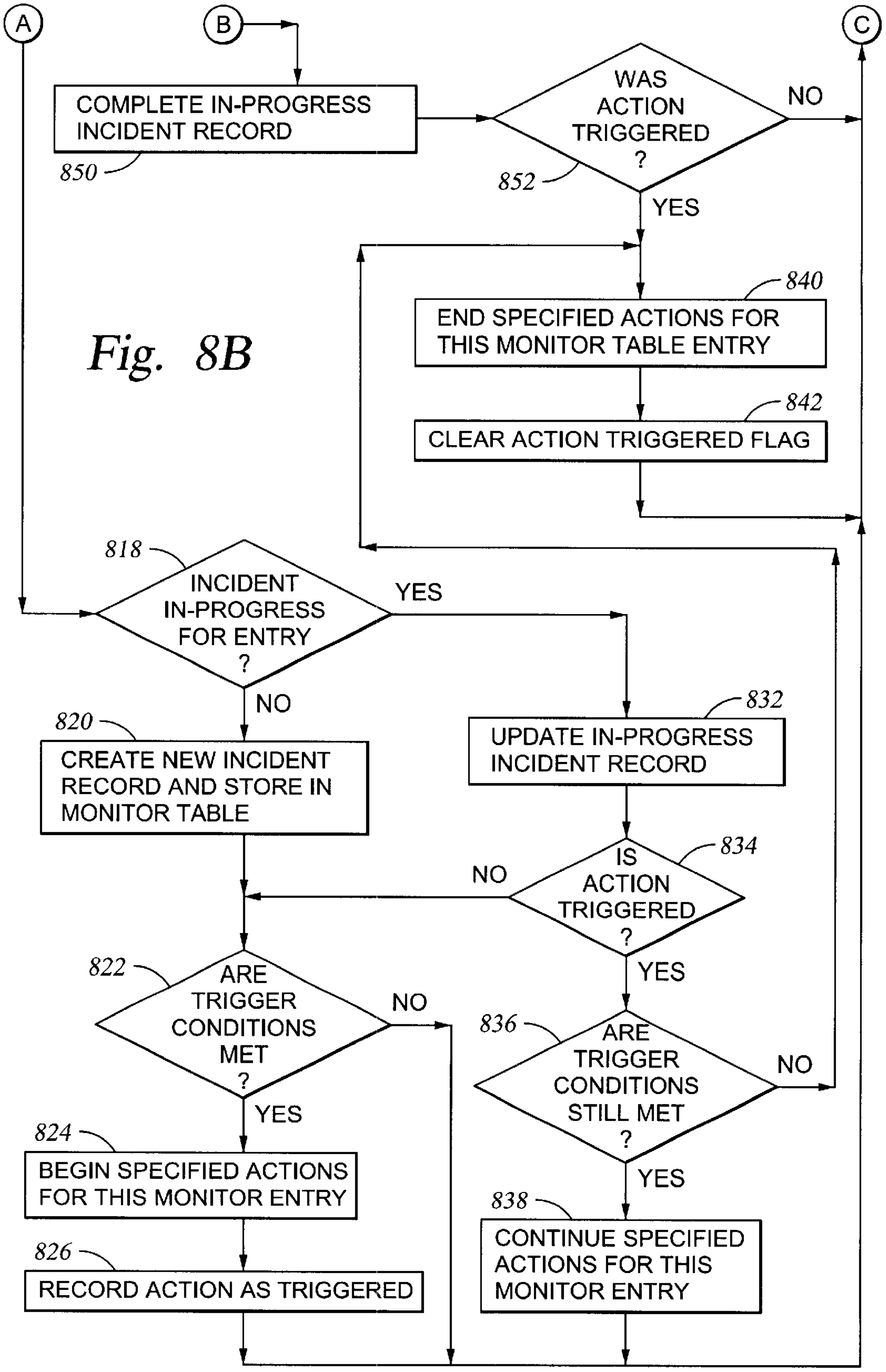

Referring to FIG. 8, a method 800 of the invention is shown utilizing data structures, such as those shown in FIGS. 4–7, and a system, such as the emergency awareness system 100 shown in FIGS. 1 and 2. Periodic reference is made to FIGS. 1–2, and 4–7 as is necessary.

The method 800 is entered at step 802 when the emergency awareness system 100 is activated. At step 804, a signal is received by the emergency awareness system 100. In step 806, the signal information is used to generate a signal record. In the case of an analog signal, an analog signal record (ASR) 170 is created and preferably includes the discrete information (channel data) provided by each individual sensor 104, 106, 108 as well as composite information (composite data) generated by combining the channel data. In the event a digital signal is received, a digital signal record (DSR) 178 is created and includes the encoded information extracted from the signal.

The method 800 then proceeds to step 808 wherein the first entry in the monitor table 140 is accessed. In step 810, a query is made to determine whether the received signal is digital or analog. If the received signal is analog, then the method 800 proceeds to step 812 wherein the information contained in the ASR 170 is correlated against the signal definition record (SDR) 147 contained in the first entry of the monitor table 140. In general, the correlation may involve any method of determining whether signal data contained in the monitor table 140 corresponds to the received analog signal. In one embodiment of the invention, an analog signature stored in the SDR 147 of the monitor table entry currently being processed is compared to the data contained in the composite data written to the ASR 170 at step 806. If the analog signature and the composite data are substantially similar within an acceptable degree of variance then the received signal is considered matched to the analog signature stored in the SDR 147.

If the query at step 810 determines that the received signal is a digital signal, the method 800 proceeds to step 814. In step 814, the digital signature extracted from the incoming signal and stored in the DSR 178 at step 806 is compared with the signature stored in the SDR 147 currently being accessed in the monitor table 140. The comparison may involve any method of determining whether signal data contained in the monitor table 140 corresponds to the received digital signal.

For both steps 812 (analog signals) and step 814 (digital signals), the method 800 then proceeds to step 816 where a query is made as to whether the received signal was detected by the onboard computer processing system 102. If a matching analog signal was found in the correlation of step 812 and/or a matching digital signature was found in the comparison of step 814, then the signal is detected at step 816.

Steps 812, 814 and 816 allows the computer system to discriminate between signals which may be of interest to an operator of a vehicle and other signals such as noise due to background traffic. As noted above, the computer system is trained by storing signal samples in the memory 126 and utilizing mechanisms, such as DSP for digital signals, to process the signal samples and received signals. In one embodiment, the signal processor unit 116 is configured to determine whether the data stored in the monitor table 140 is sufficiently similar to the received signal data. The sufficiency of similarity is a question of degree which can be resolved according to a particular application. In one embodiment, the operator of the vehicle is able to select and adjust the requisite degree of similarity using the input devices 134. Thus, where the operator selects a highly sensative setting, an algorithm executed by the emergency awareness system 100 is relatively less robost and prone to provide warnings more frequently. As a result, the emergency awareness system 100 may periodically provide false warnings due to ambient noise not of interest to the operator. In contrast, a less sensative setting will result in less frequent warnings, thereby typically ensuring a higher degree of accuracy, i.e., the warning signal in fact indicate a condition of interest to operator.

In step 818, method 800 queries whether an entry exists for the in-progress incident field 154 of the monitor table 140 for the entry in the monitor table 140 currently being accessed. Method 800 anticipates that multiple signals could exist for a single monitor table entry, such as where two or more ambulances are present within the detection zone of the emergency awareness system 100. Thus, a mechanism to differentiate between source types of the same kind is needed. Relatedly, a mechanism is needed to recognize a signal for which a signal monitor table entry already exists, otherwise a single signal may result in the creation of multiple incident records 155. Thus, the emergency awareness system 100 is preferably adapted to distinguish between sources of the same type as well as between successive detections of the same signal.

Where the signal is digital, signal differentiation may be accomplished on the basis of the unique digital incident ID recorded in the incident record 155. However, for analog signals, additional signal processing is performed by the emergency awareness system 100. In general, any known or unknown signal processing methods or apparatus may be used to distinguish between signals. In one embodiment, signals may be distinguished based on the relative positions of their respective sources. Where the EMA 100 includes multi-directional sensors, a positional determination can be made for each source to distinguish sources from one another. In another embodiment, the signal strength of the signal presently being processed is compared to the strength of the signal in the incident record 155, that is, the signal recorded during the last iteration of method 800 for the entry being processed. If the signal strengths are within a predetermined accepted degree of variation, then the signals are assumed to be the same and an incident report 155 for that signal already exists. In another embodiment, variances in signal characters other than signal strength may be used to distinguish between signals. Such signal characters include frequency, for example. In another embodiment, two or more signal characteristics, e.g., frequency and amplitude, are used.

If no entry for detected signal has been made in the in-progress incident field 154, then a new incident record 155 is created in step 820. The incident record 155 is generated using the data contained in a signal correlation record (SCR) 180, the signal definition record (SDR) 147 and information regarding the time at which the signal was first detected. In one embodiment, the signal correlation record 180 is created concurrently with the incident report 155 at step 820 and preferably contains data pertaining to the signal characteristics, such as signal strength for example.

In one embodiment, the incident record 155 may include an approaching indicator field containing information about the relative change in position between the onboard computer system 102 and the source of the detected signal. Thus, an approaching indicator field can contain a textual description indicating whether the signal source is approaching, retreating or remaining unchanged. At step 820, the approaching indicator field is initially set to "unknown" for an analog signal. A determination regarding the changing position of the signal source to the onboard computer system 102 can be made during the next iteration of method 800 as will be described below with respect to step 832. For a digital signal, information stored in the DSR 178 (created at step 806), for example, may be used to determine the relative change in position between the onboard computer system 102 and the source of the detected signal. Once the incident record 155 has been created and its various fields have been initialized, the incident record 155 is stored in the monitor table 140.

At step 822 a query is made to determine whether the predetermined trigger conditions are met. As noted previously, the trigger conditions are stored in the trigger conditions field 150 of the monitor table 140. If each of the trigger conditions contained in the trigger condition field 150 are met, then the actions specified in the action record 148 for the monitor table entry being processed are initiated as indicated by step 824. For example, an audio system such as a car stereo may output an audio warning signal to the driver of the vehicle. Additionally, in step 826, the action triggered field 152 of the monitor table 140 is modified to indicate that the specified actions have been triggered. If the trigger conditions at step 822 are not met, the method 800 proceeds to step 828 where a query is made to determine whether another entry is contained in the monitor table 140. If no additional entries are found, the method 800 returns to step 804. If an additional entry is found, the next entry is accessed in step 830 and the method 800 then returns to step 810. If a determination is made in step 818 that an incident record 155 has previously been created and stored in the incident field 154 of the monitor table 140, the incident record 155 is then updated in step 832. Updating the incident record 155 may also entail modifications to the data contained in the signature correlation record 180 and other data structures to which the incident report 155 points. The signal strengths may have changed since the previous iteration of method 800 and the changes should be reflected in the signature correlation record 180. The analog signal strengths contained in the signature correlation record 180 can then be compared between the most recently created signature correlation record and the previously created signature correlation record. By the "previous signature correlation record" is meant that signature correlation record created during the last iteration of method 800. By comparing the values of the signal strengths, a determination can be made as to whether this signal source is approaching, retreating, or remaining constant based on whether the signal has grown stronger, weaker, or unchanged. Source positioning for an analog signal may be accomplished by assuming that a relatively stronger signal indicates a closer proximity of the signal source as compared to a weaker signal. The data resulting from the comparative analysis can then be reflected by the approaching indicator field of the incident record 155.

In step 834 a query is made to determine whether one or more actions have been triggered. This determination can be made by referencing the value stored in the action triggered field 152 of the monitor table 140. If the value stored in the action triggered field 152 indicates that the action is for a given monitor table entry has not been triggered, then the method 800 proceeds to step 822. If a determination is made at step 834 that the actions have been triggered, then a query is made at step 836 as to whether the trigger conditions are still satisfied. If, for a given monitor table entry, the trigger conditions are still met then the related actions contained in the action record 149 are continued as indicated by step 838. The method 800 then proceeds to step 828.

If, at step 836, a determination is made that the trigger conditions are no longer met, the related actions are terminated at step 840 and the value contained in the action triggered field 152 is reset accordingly at step 842. The method 800 then proceeds to step 828.

If at step 816 no signal is detected, the method 800 checks for the existence of an incident record 155 for the monitor table entry being processed, as indicated by step 844. This may be done in the manner described above with reference to step 818. If no incident report 155 exists, the method 800 proceeds to step 828. If an incident record 155 does exist, a query is made to determine whether the received signal is digital or analog at step 846. If the signal is digital, the method 800 queries whether a specified timeout value has occurred or has been satisfied for this incident at step 848. The provision of the timeout value ensures that the triggered actions are performed for a desired period of time and not prematurely terminated nor continually executed. Accordingly, if the timeout value has not been satisfied, the method 800 proceeds to step 828. However, if the timeout value has been satisfied, the incident report 155 is completed and closed in step 850. Thus, for example, an end time for the particular incident is recorded and the record 155 is moved to storage 124. In step 852, the method 800 queries whether one or more actions were triggered for the particular monitor table entry being processed. If no actions were triggered, the method 800 proceeds to step 828. If one or more actions were triggered, the related actions are terminated and the action trigger field 152 is reset as indicated by steps 840 and 842. The method 800 then proceeds to step 828.

While the foregoing is directed to the preferred embodiment of the present invention, other and further embodiments of the invention may be devised without departing from the basic scope thereof, and the scope thereof is determined by the claims that follow.

What is claimed is:

1. A computer system for use in a vehicle, comprising:

(a) one or more signal sensors configured to receive a source signal from an external source external to the vehicle and transmit an input signal corresponding to the source signal;

(b) a signal processing unit comprising a memory containing stored signal data representing a plurality of ambient driving conditions and coupled to the one or more signal sensors, wherein the signal processing unit is configured to perform the steps of:

(i) receiving the input signal;

(ii) comparing the input signal to the stored signal data; and (iii) selectively producing an output signal; and (c) one or more output devices coupled to the signal processing unit and configured to provide a warning output to an operator of the vehicle upon receiving the output signal.

2. The computer system of claim 1, wherein the stored signal data identifies one or more signal sources selected from the group comprising vehicles, road hazards, a school zone and combinations thereof.

3. The computer system of claim 1, wherein the one or more output devices are selected from the group comprising analog devices, digital devices and combinations thereof.

4. The computer system of claim 1, wherein the output devices comprise a device selected from the group comprising a light source, an audio source, a wireless communication device, a text display and combinations thereof.

5. The computer system of claim 1, further comprising a program product containing the stored signal data and which, when executed by the signal processing unit, provides the stored signal data to the memory and performs the steps (b)(i)–(iii).

6. The computer system of claim 1, wherein the memory further contains trigger condition data which, when read and executed by the computer system, determines whether the output signal is produced at step (b)(iii).

7. The computer system of claim 1, wherein the memory contains a data structure containing:

(i) the stored signal data;

(ii) trigger condition data which, when read and executed by the computer system, determines whether the output signal is produced at step (b)(iii); and (iii) an action record containing information about which of the one or more output devices are selected to provide the warning signal.

8. The computer system of claim 1, wherein the stored signal data contains analog signal information and digital signal information.

9. The computer system of claim 1, wherein the signal processing unit is configured to determine at least one of a distance between the computer system and the external source and the direction of the external source relative to the computer system.

10. The computer system of claim 9, wherein the memory contains a Global Positioning System (GPS) program which, when executed by the computer system, determines a position of the computer system.

11. An appartus, comprising:

(a) a vehicle; and (b) a computer system disposed on the vehicle, comprising:

(i) one or more sensors adapted to receive a source signal from an external source external to the vehicle and transmit an input signal corresponding to the source signal;

(ii) a signal processing unit coupled to the one or more signal sensors and configured to receive the input signal and generate and output signal in the event the input signal is recognizable as one of a plurality of driving conditions external to the vehicle; and (iii) one or more output devices coupled to the signal processing unit and configured to receive the output signal and provide a warning output to a vehical operator indicating a condition external to the vehicle.

12. The apparatus of claim 11, wherein the source is selected from the group comprising another vehicle, a road hazard area, a school zone and a combination thereof.

13. The apparatus of claim 11, wherein the output devices comprise a device selected from the group comprising a light source, an audio source, a wireless communication device, a text display and any combination thereof.

14. The apparatus claim 11, further comprising a Global Positioning System (GPS) configured to determine a position of the computer system and wherein the signal processing unit is configured to determine at least one of the distance between the computer system and the external source and the relative direction of movement between the external source and the computer system.

15. The apparatus of claim 11, further comprising a memory accessible by the signal processing unit and containing stored signal data identifying the plurality of driving conditions external to the vehicle and wherein the step of determining whether the input signal is recognizable comprises comparing the input signal with the stored signal data.

16. The apparatus of claim 15 wherein the memory further contains trigger condition data which, when read and executed by the computer system, determines whether the output signal is generated.

17. A signal-bearing medium containing a program which, when executed by one or more processors, performs the steps of:

(a) processing a signal to provide signal information therefrom;

(b) determining a relationship between the signal information and stored information contained in a data structure, wherein the stored information represents a plurality of driving conditions external to a vehicle; and (c) outputting a warning signal to one or more output devices to alert a person operating the vehicle of a driving condition in an external environment of the vehicle.

18. The signal-bearing medium of claim 17, wherein the stored information contains analog signal information and digital signal information.

19. The signal-bearing medium of claim 17, further comprising a computer system disposed on the vehicle comprising the one or more processors and the one or more output devices.

20. The signal-bearing medium of claim 17, wherein the signal bearing medium contains a Global Positioning System (GPS) program which, when executed by the by one or more processors, determines a position of the vehicle.

21. The signal-bearing medium of claim 17, wherein step (c) comprises activating one or more output devices disposed in the vehicle.

22. The signal-bearing medium of claim 17, wherein step (c) comprises first determining whether trigger conditions are met in the event a relationship is found in step (b).

23. The signal-bearing medium of claim 22, wherein the trigger conditions are selected from the group comprising a duration of the signal, a source of the signal, an intensity of the signal, a position of a source of the signal relative to the vehicle, a direction of travel of the signal relative to the vehicle and combinations thereof.

24. The signal-bearing medium of claim 17, wherein the stored information identifies one or more signal sources each of which can affect a driving behavior of the person operating the vehicle.

25. The signal-bearing medium of 17, wherein the stored information identifies one or more signal sources selected from the group comprising vehicles, road hazard sites, school zones and combinations thereof.

26. A method of alerting a driver of a vehicle to a condition in an environment external to the vehicle, comprising:

(a) providing a computer system comprising a data structure containing signal-type information representing a plurality of driving conditions external to the vehicle;

(b) receiving a signal from a source external to the vehicle;

(c) processing the signal to provide signal information; and (d) determining whether a relationship between the signal information and the signal-type information exists;

(e) outputting a warning signal to one or more output devices disposed in the vehicle in order to alert the driver of the vehical to the condition.

27. The method of claim 26 wherein (d) comprises determining whether the source identifies an emergency vehicle or a road hazard.

28. The method of claim 26, further comprising providing a warning signal to one or more output devices disposed in the vehicle in the event trigger condition information stored in the data structure is satisfied by the signal information.

29. The method of claim 28 wherein the trigger conditions are selected from the group of signal duration, signal source, direction of travel of the signal source, signal intensity, position of the signal source relative to the vehicle and any combination thereof.

30. A method of detecting a condition in an environment of a vehicle, comprising:

(a) training a computer system to recognize one or more signal types identifying conditions selected from the group of emergency vehicles, road hazard areas, school zones and combinations thereof;

(b) receiving a signal from a source;

(c) determining whether the signal is sufficiently similar to one or more of the signal types; and (d) if the signal is sufficiently similar in (c), outputting a warning signal to one or more output devices in order to alert an operator of the vehicle of the condition.

31. The method 30, further comprising, prior to (d), the step of:

if the signal is sufficiently similar in (c), determining whether one or more trigger conditions contained in a data structure on the computer system are satisfied.

32. The method of 30, wherein training the computer system comprises storing data samples on the computer system.

* * * * *